United States Patent
Zhang et al.

(10) Patent No.: US 12,399,642 B2
(45) Date of Patent: Aug. 26, 2025

(54) HETEROGENEOUS MEMORY-BASED DATA MIGRATION METHOD BASED ON RECENT ACCESS INTERVAL AND MEMORY ACCESS PATHS

(71) Applicant: HANGZHOU ALICLOUD FEITIAN INFORMATION TECHNOLOGY CO., LTD., Zhejiang (CN)

(72) Inventors: Zhengxian Zhang, Beijing (CN); Xunlei Pang, Chengdu (CN); Jiang Zhong, Hangzhou (CN); Baolin Wang, Shanghai (CN)

(73) Assignee: Hangzhou Alicloud Feitian Information Technology Co., LTD., Hangzhou (CN)

(*) Notice: Subject to any disclaimer, the term of this patent is extended or adjusted under 35 U.S.C. 154(b) by 0 days.

(21) Appl. No.: 18/687,206

(22) PCT Filed: Aug. 15, 2022

(86) PCT No.: PCT/CN2022/112554
§ 371 (c)(1),
(2) Date: Feb. 27, 2024

(87) PCT Pub. No.: WO2023/029971
PCT Pub. Date: Mar. 9, 2023

(65) Prior Publication Data
US 2024/0361942 A1    Oct. 31, 2024

(30) Foreign Application Priority Data
Aug. 30, 2021   (CN) .................. 202111005906.9

(51) Int. Cl.
G06F 3/06 (2006.01)

(52) U.S. Cl.
CPC ............ G06F 3/0649 (2013.01); G06F 3/061 (2013.01); G06F 3/0685 (2013.01)

(58) Field of Classification Search
CPC ........... G06F 3/0647–065; G06F 3/061; G06F 3/0685
See application file for complete search history.

(56) References Cited

U.S. PATENT DOCUMENTS

2015/0106582 A1* 4/2015 Mai .................. G06F 12/08
                                                   711/165
2015/0370503 A1* 12/2015 Helak ................ G06F 3/0644
                                                   711/112
(Continued)

FOREIGN PATENT DOCUMENTS

| CN | 109901800 A | 6/2019 |
| CN | 110134514 A | 8/2019 |
| CN | 113835624 A | 12/2021 |

OTHER PUBLICATIONS

Chinese Office Action for CN Application No. 202111005906.9 mailed Mar. 6, 2024, 14 pgs.
(Continued)

*Primary Examiner* — Chie Yew
(74) *Attorney, Agent, or Firm* — Fletcher Yoder P.C.

(57) ABSTRACT

Embodiments of the present specification provide a data migration method based on a heterogeneous memory, the heterogeneous memory comprising a high-speed memory and a low-speed memory. The method comprises: determining access frequency information of memory pages by monitoring a memory access operation for the heterogeneous memory; and migrating, under a first condition, cold data in the high-speed memory to the low-speed memory, the cold data being determined based on the access frequency information.

14 Claims, 2 Drawing Sheets

(56) References Cited

U.S. PATENT DOCUMENTS

| | | | |
|---|---|---|---|
| 2016/0070478 A1* | 3/2016 | Hara | G06F 3/067 |
| | | | 711/114 |
| 2018/0046378 A1 | 2/2018 | Coburn et al. | |
| 2018/0107598 A1 | 4/2018 | Prodromou et al. | |
| 2018/0260323 A1 | 9/2018 | John et al. | |
| 2019/0095104 A1* | 3/2019 | Greenfield | G06F 3/0653 |
| 2020/0218668 A1 | 7/2020 | Han et al. | |
| 2022/0291853 A1* | 9/2022 | He | G06F 3/0611 |

OTHER PUBLICATIONS

International Search Report for PCT Application No. PCT/CN2022/112554 mailed Oct. 28, 2022, 3 pgs.

* cited by examiner

HETEROGENEOUS MEMORY-BASED DATA MIGRATION METHOD BASED ON RECENT ACCESS INTERVAL AND MEMORY ACCESS PATHS

The present application is a U.S. national stage filing of International Patent Application No. PCT/CN2022/112554, filed on Aug. 15, 2022, and entitled "HETEROGENEOUS MEMORY-BASED DATA MIGRATION METHOD", which claims priority to Chinese patent application No. 202111005906.9, filed on Aug. 30, 2021, and entitled "HETEROGENEOUS MEMORY-BASED DATA MIGRATION METHOD", both of which are incorporated herein by reference in their entireties.

TECHNICAL FIELD

One or more embodiments of this specification relate to the field of computer technology, and in particular to a data migration method based on a heterogeneous memory.

BACKGROUND

Heterogeneous memory consists of two non-homogeneous media, i.e., a high-speed memory and a low-speed memory. The high-speed memory, such as a DDR memory, possesses characteristics of high performance but small capacity and high costs etc., while the low-speed memory, such as a persistent memory, possesses characteristics of low performance but large capacity and low costs etc.

Current use of heterogeneous memory products requires users to understand the memory system architecture and use dedicated library functions to perform business transformation, so as to identify and isolate cold and hot data in the user business. This sets for the users a too high barrier for use, which discourages most of them and also makes it difficult to achieve expected performance of the products.

Thus, there is an urgent need for a solution that may effectively lower the barrier for users to use heterogeneous memory products, while fully improves usage performance of the heterogeneous memory products.

SUMMARY

One or more embodiments of this specification describe a data migration method and apparatus based on a heterogeneous memory, which separates the ability originally required for a user to perform cold and hot data identification, and automatically performs user-unaware cold and hot data identification, migration, and memory address remapping, or the like, thereby enabling the user to use a heterogeneous memory product with no barrier, while fully improving usage performance of the heterogeneous memory.

According to a first aspect, a data migration method based on a heterogeneous memory is provided, the heterogeneous memory comprising a high-speed memory and a low-speed memory, and the method comprising: determining access frequency information of memory pages by monitoring a memory access operation for the heterogeneous memory; and migrating, under a first condition, cold data in the high-speed memory to the low-speed memory, the cold data being determined based on the access frequency information.

In one embodiment, determining the access frequency information of memory pages by monitoring the memory access operation for the heterogeneous memory comprises: periodically acquiring, according to a predetermined time cycle, a recent access interval of each memory page in the high-speed memory, the recent access interval indicates a number of interval cycles between a last access operation time and a current time cycle; and determining, according to the recent access interval, a coldness label of each memory page, and incorporating the coldness label of each memory page into the access frequency information.

In one specific embodiment, the coldness label indicates whether a corresponding memory page is a cold page; and migrating the cold data in the high-speed memory to the low-speed memory comprises: determining, in the high-speed memory, at least part of pages that are indicated as the cold pages by the coldness labels, and migrating data in the at least part of pages as the cold data to the low-speed memory. In another specific embodiment, the coldness label indicates a coldness level of a corresponding memory page; and migrating the cold data in the high-speed memory to the low-speed memory comprises: sequentially, in descending order of the coldness levels, migrating cold data in corresponding memory pages to the low-speed memory.

In one embodiment, the first condition comprises one of the following: it has been detected that a current remaining available space of the high-speed memory is less than a preset first capacity; a memory request has been received, and a requested capacity by the memory request is greater than the current remaining available space; or a memory request has been received, and an expected remaining space after deducting the requested capacity by the memory request from the current remaining available space is less than a preset second capacity.

In one embodiment, migrating the cold data in the high-speed memory to the low-speed memory comprises: lowering a bandwidth currently occupied by the migration if it is detected that a data amount of the cold data having been migrated within a historical period exceeds a corresponding threshold in a process of the migration.

In another aspect, in one embodiment, the method further comprises: migrating hot data in the low-speed memory to the high-speed memory, the hot data being determined based on the access frequency information.

In one specific embodiment, determining the access frequency information of memory pages by monitoring the memory access operation for the heterogeneous memory comprises: monitoring memory access paths for the heterogeneous memory to acquire hot path information; and adding, according to the hot path information, a hotness label for a relevant memory page in the low-speed memory.

In one more specific embodiment, the hot path information comprises: information of a memory access path with an access frequency greater than a frequency threshold within a preset first time period; or information of a memory access path with an access history within a second time period from a current moment.

In another specific embodiment, determining the access frequency information of memory pages by monitoring the memory access operation for the heterogeneous memory comprises: in response to a certain memory page in the low-speed memory having been accessed, determining a time interval between a time when the certain memory page is migrated out from the high-speed memory to the low-speed memory and a current time; and adding a hotness label for the certain memory page according to the time interval, and incorporating the hotness label into the access frequency information.

In one more specific embodiment, the certain memory page corresponds to a certain operation object in an application layer, the certain operation object has a preconfigured associated operation object; wherein determining the access frequency information of memory pages comprises: adding, according to the time interval, the hotness label for a memory page corresponding to the associated operation object.

Further, in one example, the hotness label indicates a hotness level of a corresponding memory page; and migrating the hot data in the low-speed memory to the high-speed memory comprises: sequentially, in descending order of the hotness levels, migrating hot data in corresponding memory pages to the high-speed memory.

In another example, the hotness label indicates whether data in a corresponding memory page is the hot data, and the hotness label is determined based on a comparison between the time interval and an interval threshold.

In one more specific example, migrating the hot data in the low-speed memory to the high-speed memory comprises: reducing the interval threshold if it is detected that a data amount of the hot data having been migrated within a historical period exceeds a corresponding upper limit threshold; or increasing the interval threshold if it is detected that a data amount of the hot data having been migrated is less than a corresponding lower limit threshold.

In one specific embodiment, migrating the hot data in the low-speed memory to the high-speed memory comprises: lowering a bandwidth currently occupied by hot data migration if it is detected that a data amount of the hot data having been migrated within a historical period exceeds a corresponding threshold in a process of migrating the hot data.

According to a second aspect, a data migration apparatus based on a heterogeneous memory is provided, the heterogeneous memory comprising a high-speed memory and a low-speed memory, and the apparatus comprising: a monitoring unit, configured to determine access frequency information of memory pages by monitoring a memory access operation for the heterogeneous memory; and a cold data migration unit, configured to migrate, under a first condition, cold data in the high-speed memory to the low-speed memory, the cold data being determined based on the access frequency information.

In one embodiment, the apparatus further comprises: a hot data migration unit, configured to migrate hot data in the low-speed memory to the high-speed memory, the hot data being determined based on the access frequency information.

According to a third aspect, a computer-readable storage medium is provided, in which a computer program is stored, and the computer program, when executed in a computer, causes the computer to execute the method provided above in the first aspect.

According to a fourth aspect, a computing device is provided, comprising a memory and a processor, wherein executable codes are stored in the memory, and implement, when executed by the processor, the method provided above in the first aspect.

By employing the method and apparatus provided in the embodiments of this specification, access frequency information is acquired by monitoring an access operation for the heterogeneous memory to achieve automatic identification and migration of cold data in the high-speed memory and hot data in the low-speed memory.

BRIEF DESCRIPTION OF THE DRAWINGS

In order to provide a clearer explanation of the technical solutions in the embodiments of the present application, a brief introduction will be made below to the drawings needed in describing the embodiments. Obviously, the drawings in the following description are only some embodiments of the present application. For persons with ordinary skills in the art, other drawings may be further obtained according to these drawings without putting in any creative labor.

DETAILED DESCRIPTION

The solutions provided in this specification will be described below with reference to the drawings.

As mentioned previously, the current barrier for the users to use heterogeneous memory products is too high, which discourages most of the users.

Figure 1:
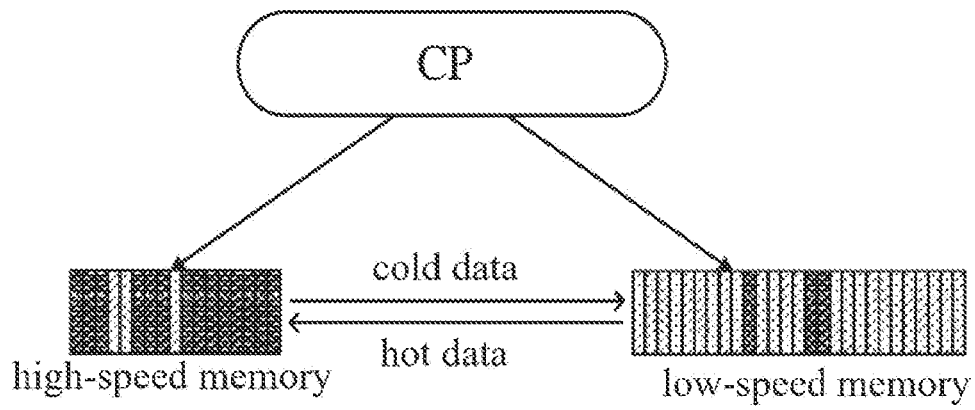
FIG. 1 illustrates a schematic diagram of an implementation scenario of a solution of performing data migration based on a heterogeneous memory according to an embodiment.

An embodiment of this specification discloses a solution that enables users to use heterogeneous memory products with no barrier. FIG. 1 illustrates a schematic diagram of an implementation scenario of a solution of performing data migration based on a heterogeneous memory according to an embodiment. CPU monitors access frequency information of memory pages in the heterogeneous memory, thereby automatically storing some warm-cold data that requires a relatively low access speed and was originally stored in a high-speed memory into a low-speed memory, and timely migrating frequently accessed key hot data from the low-speed memory to the high-speed memory. Heterogeneous memory offers a large capacity, making it more cost-effective per unit storage space (e.g., a single GiB). By implementing the above solution, this may help the users significantly reduce the total cost of ownership (TCO) of memory per unit space.

Figure 2:
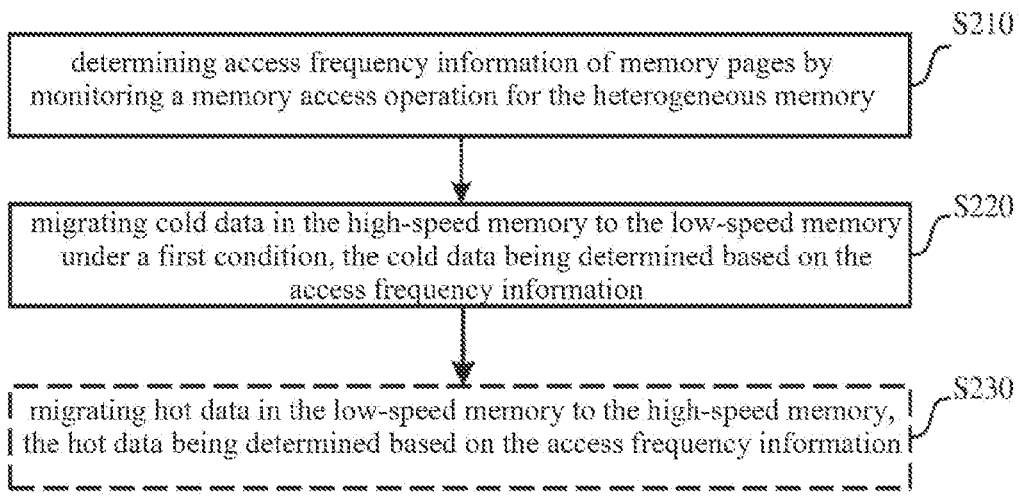
FIG. 2 illustrates a schematic flow chart of a data migration method based on a heterogeneous memory according to an embodiment.

Implementation steps of the above solution will be described below with reference to specific examples. FIG. 2 illustrates a schematic flow chart of a data migration method based on a heterogeneous memory according to an embodiment. It should be noted that the heterogeneous memory comprises a first memory area and a second memory area, wherein a read-write speed in the first memory area is better than that in the second memory area. For the purpose of direct description, the first memory area may be called below as a high-speed memory, and the second memory area may be called below as a low-speed memory, which may be referred to FIG. 1, for example; wherein the high-speed memory possesses characteristics of high performance but small capacity and high costs, and specifically may employ DRAM (Dynamic Random Access Memory), DDR SDRAM (Double Data Rate Synchronous Dynamic Random Access Memory), or the like; and the low-speed memory possesses characteristics of low performance but large capacity and low costs, and specifically may employ a persistent memory, or the like.

An execution subject of the above method may be any server, apparatus, platform, or device cluster with computing and processing capabilities. As shown in FIG. 2, the above method comprises the following steps:

at step S210, determining access frequency information of memory pages by monitoring a memory access operation for the heterogeneous memory; and further, at step S220, migrating, under a first condition, cold data in a high-speed memory to a low-speed memory, wherein the cold data is determined based on the access frequency information.

Regarding the above steps S210 and S220, in one embodiment, step S210 may comprise sub-steps S2101 and S2102. Specifically, first at sub-step S2101, a recent access interval of each memory page in the high-speed memory is periodically acquired according to a first predetermined time cycle, which indicates an interval duration between the last access operation time and a current time cycle.

It should be understood that the above first predetermined time cycle may be set by the staff according to practical experiences. Moreover, a cycle duration is usually set to be longer so that operations related to cold data identification are low-frequency, thereby avoiding excessive internal consumption of resources, while also helping to accurately identify cold data in the high-speed memory.

Based on the above first predetermined time cycle, a recent access interval of a memory page may be acquired periodically. In one example, the interval duration indicated by the recent access interval is in milliseconds or seconds. In another example, the interval duration indicated by the recent access interval may be quantified as the number of interval cycles between the last access operation time and a current time cycle. It should be understood that a unit interval cycle corresponding to this number of interval cycles is different from the above first predetermined time cycle. Usually, a duration of the former is shorter than that of the latter.

After the recent access interval of each memory page of pages in the high-speed memory is acquired above, at sub-step S2102, a coldness label of each memory page is determined according to the recent access interval and incorporated into the above access frequency information.

In one specific embodiment, the coldness label indicates whether a corresponding memory page is a cold page. Accordingly, for each memory page in the high-speed memory, if its corresponding recent access interval exceeds a duration threshold, its corresponding coldness label will be determined to be a positive cold label, which indicates that the corresponding memory page is a cold page; otherwise, its corresponding cold label is determined to be a negative cold label, which indicates that the corresponding memory page is not a cold page.

Further, as for determination of the above duration threshold used for comparison with the recent access interval, the duration threshold may be preset by the staff according to practical experiences in one example; and it may also be determined according to recent access intervals of all memory pages in the heterogeneous memory in another example. Specifically, at the above step S210, in addition to acquiring a recent access interval of a memory page in the high-speed memory, a recent access interval of a memory page in the low-speed memory is further acquired, thereby determining the above duration threshold based on all the recent access intervals as acquired. For example, all the recent access intervals may be sorted in descending order, and a duration segmenting the first 30% and the remaining 70% of them may be determined as the above duration threshold.

In this way, a coldness label of each memory page in the high-speed memory may be determined by comparing the recent access interval with the duration threshold, which indicates whether a corresponding memory page is a cold page.

In another specific embodiment, the above coldness label indicates a coldness level of a corresponding memory page. Accordingly, for each memory page in the high-speed memory, the coldness level corresponding to its recent access interval may be determined and used as its coldness label based on a preset mapping relationship between interval duration ranges and alternative coldness levels. In one example, the numerical value of the number of interval cycles indicated by the recent access interval may be directly determined as the coldness level and used as the coldness label of the corresponding memory page. It should be noted that in order to facilitate a clear description, in the embodiments of this specification, the higher the coldness level, the colder the corresponding data, that is, the longer it has not been accessed, which is taken as a main example for relevant introduction. In fact, the coldness level may also be set in reverse.

From the above, the coldness label of each memory page in the high-speed memory may be determined and incorporated into the above access frequency information. It should be understood that access frequency information refers to information related to access frequency, or information that may reflect access frequency, where the access is made to the heterogeneous memory, and the frequency may be interpreted as a degree of frequency.

Based on the above, step S220 may be executed, i.e., migrating, under a first condition, cold data determined based on a coldness label in the above access frequency information from the high-speed memory to the low-speed memory.

It should be noted that in one implementation, the cold data may be directly migrated out of the high-speed memory with no need to trigger the first condition. However, in actual applications, data usually may be stored first in the high-speed memory for quick access by CPU. Therefore, in the embodiments emphatically disclosed in this specification, several triggering conditions are set to trigger the migration of cold data, thereby enhancing the overall usage performance of heterogeneous products. In addition, in one implementation scenario, cold data in the high-speed memory may be determined first based on the coldness labels in the access frequency information, and then the cold data may be migrated based on triggering of the first condition. In another implementation scenario, cold data may also be determined and migrated successively in response to triggering the first condition. Even in still another implementation scenario, the above recent access interval may also be acquired in response to triggering the first condition, thereby determining and migrating cold data.

As for the above first condition for triggering cold data migration, in one embodiment, it is set as it has been detected that a current remaining available space of the high-speed memory is less than a preset first capacity. In this way, by presetting a migration baseline, migration of cold data in the high-speed memory is triggered in advance, thereby effectively avoiding an adverse impact of synchronous migration in the process context on performance. In one example, in response to the current remaining space of the high-speed memory being less than the first capacity, the cold data in the high-speed memory is migrated to the low-speed memory through a system process (or kernel process); afterwards, in response to a memory request has been received, a requested capacity corresponding to this memory request is allocated in the high-speed memory through a business process (or user process), this requested capacity being smaller than the first capacity. In this way, by defining the migration baseline, an asynchronous migration of the cold data is triggered in advance and completed through the system process, which may effectively avoid interruption of the business process.

In another embodiment, the above first condition may also be set as a memory request has been received, and a requested capacity by this memory request is greater than a current remaining available space of the high-speed memory. In this way, it may guarantee that allocation is performed from the high-speed memory when a memory request is received. In still another embodiment, it may also be set as receiving a memory request, and an expected remaining space being less than a preset second capacity, wherein the expected remaining space is a space after deducting the requested capacity by this memory request from a current remaining available space of the high-speed memory. In this way, it may guarantee that the requested memory is allocated from the high-speed memory. Meanwhile, migration of cold data in the high-speed memory is triggered in advance, thereby avoiding an adverse impact of synchronous migration in the process context on performance.

As for the above determination of cold data based on the coldness label, in an implementation A, determination of cold data does not depend on the content of the above first condition. Based on this, in one embodiment, assuming that the above coldness label indicates whether a corresponding memory page is a cold page, then the above cold data may be determined based on a plurality of cold pages in the high-speed memory. In one specific embodiment, data in the plurality of cold pages all may be used as cold data. In another specific embodiment, some cold pages may be selected from the plurality of cold pages based on a preset ratio, and data in this part of cold pages may be used as cold data. In another embodiment, assuming that the above coldness label indicates a coldness level of a corresponding memory page, then a memory page in the high-speed memory with a coldness level greater than a preset level may be determined, and data therein may be used as cold data.

In an implementation B, determination of cold data depends on the content of the above first condition. Based on this, in one embodiment, an amount of data required to be migrated out of the high-speed memory is determined according to the content of this condition, thereby determining, from the high-speed memory, cold data occupying a corresponding space capacity according to this amount of data to be migrated out.

In one specific embodiment, assuming that the above first condition is: it has been detected that a remaining available space of the high-speed memory is less than a preset first capacity, then the above amount of data to be migrated out may be determined as a difference between this first capacity and the current remaining available space in the high-speed memory. In another specific embodiment, assuming that the above first condition is that a requested capacity by a memory request as received is greater than a current remaining available space, then the above amount of data to be migrated out may be determined as a difference between this requested capacity and this current remaining available space. In still another specific embodiment, assuming that the above first condition is: receiving a memory request, and an expected remaining space obtained after deducting a requested capacity by this memory request from a current remaining available space being less than a preset second capacity, then the above amount of data to be migrated out may be determined as a difference between this second capacity and the expected remaining space.

In this way, the amount of data to be migrated out may be determined. Further, cold data occupying a corresponding amount of data is determined from the high-speed memory. In one specific embodiment, assuming that the above coldness label indicates whether a corresponding memory page is a cold page, then data in a cold page(s) corresponding to the above amount of data to be migrated out may be determined from a plurality of cold pages in the high-speed memory, and used as cold data. Further, in one example, assuming that a space capacity occupied by this plurality of cold pages is greater than the amount of data to be migrated out, part of cold pages corresponding to this amount of data to be migrated out may be selected from the plurality of cold pages, and data therein may be used as cold data. In another example, assuming that a space capacity occupied by this plurality of cold pages is equal to the amount of data to be migrated out, then data in this plurality of pages all may be used as cold data. In still another example, assuming that a space capacity occupied by this plurality of cold pages is less than the amount of data to be migrated out, then more memory pages in the high-speed memory may be determined as cold pages by adjusting an identification rule for the coldness label, and then cold pages corresponding to the above amount of data to be migrated out may be determined and data therein may be used as cold data to be migrated out.

In another specific embodiment, assuming that the above coldness label indicates a coldness level of a corresponding memory page, then memory pages in the high-speed memory may be sequentially classified into cold data based on coldness levels in descending order until the space occupied by the cold data reaches the above amount of data to be migrated out.

From the above, the cold data may be determined. Further, the cold data is migrated out of the high-speed memory to the low-speed memory. In one specific embodiment, assuming that the above coldness label indicates a coldness level, then cold data with a high coldness level may be migrated out preferentially. In another aspect, in one specific embodiment, during a cold data migration process, if it is detected that a data amount of cold data having been migrated within a historical period (e.g., recent 5 seconds) exceeds a corresponding threshold (e.g., 500 MB), then a bandwidth currently occupied by the migration will be lowered, specifically by a predetermined percentage (e.g., 10%), or to a preset bandwidth value (e.g., 90 MB/s). In this way, in asynchronous migration for reclaiming cold memory, speed limiting may be used to avoid excessive cold data being migrated from the high-speed memory to the low-speed memory.

From the above, by employing the above data migration method, cold data in the high-speed memory may be determined based on the access frequency information, and migrated to the low-speed memory, thereby achieving automatic recycling of cold memory in the high-speed memory.

It should be noted that according to an embodiment in another aspect, in the above data migration method, it is possible to further achieve determination of hot data in the low-speed memory based on the access frequency information and migration of the same back to the high-speed memory. Specifically, after the above step S210 or step S220, step S230 may also be executed, i.e., migrating hot data in the low-speed memory to the high-speed memory, the hot data being determined based on the above access frequency information.

Accordingly, for the above steps S210 and S230, in one embodiment, step S210 may further comprise sub-steps S2103 and S2104. Specifically, at sub-step S2103, memory access paths for the heterogeneous memory are monitored to acquire hot path information.

In one specific embodiment, a historical memory access path data generated within a preset first time period may be acquired, which, for example, may comprise memory access paths and a timestamp of each access; then, based on this historical memory access path data, information of a memory access path with an access frequency greater than a frequency threshold within this first time period may be statistically collected, and used as the above hot path information. It should be understood that a second preset time cycle is different from the above first preset time cycle based on which the recent access interval is acquired. Usually, a cycle duration of the former is shorter than that of the latter, thereby performing operations related to hot data identification at a high frequency, and then identifying hot data in time. In addition, for the above first time period, its duration may be the same as or different from the duration of the second preset time cycle.

Further, as for determination of the above frequency threshold used for comparison with the access frequency, it may be preset by the staff according to practical experiences in one example; and it may also be determined based on all access frequencies obtained statistically according to the historical memory access path data in another example. For example, all access frequencies may be sorted in descending order, and a duration segmenting the first 20% and the remaining 80% of them may be determined as the above frequency threshold.

As for the hot path information determined above, in one example, it may comprise a path location of a corresponding memory access path, such as a virtual address, or the like. In another example, it may further comprise an access frequency of a corresponding memory access path.

In this way, the hot path information may be determined by comparing the access frequency with the frequency threshold. In another specific embodiment, information of a memory access path with an access history within a second time period from a current moment may be acquired periodically according to a third preset time cycle, and used as the above hot path information. It should be understood that the third preset time cycle is different from the first preset time cycle employed above when acquiring the recent access interval. Usually, a cycle duration of the former is shorter than that of the latter, thereby performing operations related to hot data identification at a high frequency, and then identifying hot data in time. In addition, the third preset time cycle and the second time period usually have the same duration.

Based on the above, hot path information may be determined. Then, at sub-step S2104, according to this hot path information, a hotness label is added for a relevant memory page in the low-speed memory. In one specific embodiment, according to each memory access path included in the hot path information, a positive hotness label is added for each memory page located in the low-speed memory among several memory pages directed to by respective memory access paths, indicating that data in a corresponding memory page is hot data, or in other words, indicating that a corresponding memory page is a hot page. In one example, the hot path information comprises a virtual address of a memory access path, based on which, a physical address corresponding to the virtual address accessed by the memory may be determined with reference to a mapping relationship between virtual addresses and physical addresses, and then a corresponding memory page may be located according to this physical address.

In another specific embodiment, according to each memory access path included in the hot path information and a corresponding access frequency, a hotness label is added for each memory page located in the low-speed memory among several memory pages to which the memory access paths are directed, indicating a hotness level of a corresponding memory page. In one more specific embodiment, based on a preset mapping relationship between access frequency ranges and alternative hotness levels, a hotness level corresponding to an access frequency in the hot path information may be determined, and used as a hotness label of a corresponding memory page. It should be noted that in order to facilitate a clear description, in the embodiments of this specification, the higher the hotness level, the hotter the corresponding data, that is, the access thereto is more frequent, which is taken as a main example for relevant introduction. In fact, the hotness level may also be set in reverse.

Based on the above, a hotness label may be added for a memory page located in the low-speed memory to which a memory access path in the hot path information is directed. According to an embodiment in another aspect, a hotness label may also be added according to the hot path information for a memory page not directed to by the same but having an associated relationship. Specifically, as for some memory pages in the heterogeneous memory, there are corresponding operation objects in an application layer, for example, an order submission icon in a corresponding shopping APP interface. According to the principle of computer locality, after a user triggers a certain operation object, there will be a high probability of subsequently triggering another operation object associated therewith (or simply referred to as associated operation object), for example, an order payment icon in the shopping APP interface. According to this, for any memory page that has been added with a hotness label, if its corresponding operation object in the application layer has a preconfigured associated operation object, a memory page corresponding to this associated operation object may be added with the same hotness label as the one the above memory page has. Accordingly, when a certain memory page directed to by the hot path information is migrated out as hot data, a memory page associated therewith will be migrated together back to the high-speed memory as hot data even if it has not been accessed. In this way, premigration of associated memory pages is performed, so that data therein having a high probability of being accessed may be quickly accessed, thereby effectively enhancing access performance.

Based on the above, by executing sub-steps S2103 and S2104, the hot path information may be determined, and a hotness label may be added for a memory page related thereto in the low-speed memory, and then incorporated into the access frequency information.

In another embodiment, step S210 may comprise: in response to a certain memory page in the low-speed memory having been accessed, determining a time interval between a time when it is migrated out from the high-speed memory to the low-speed memory and a current time, thereby adding a hotness label for this certain memory page and incorporating the hotness label into the above access frequency information.

In one specific embodiment, based on a preset mapping relationship between time interval ranges and alternative hotness levels, a hotness level corresponding to the above time interval may be determined, and used as the hotness label of the above certain memory page.

In another specific embodiment, in a case that the above time interval is greater than an interval threshold, the hotness label corresponding to this certain memory page is determined as a positive hotness label, which indicates that data in the corresponding memory page is hot data; otherwise, it is determined as a negative hotness label, which indicates that the data in the corresponding memory page is not hot data.

As for setting of the above interval threshold used for comparison with the time interval, in one example, it may be the system default. In another example, it may be self-defined by the user using the heterogeneous memory. In still another example, the interval threshold may be dynamically adjusted. Specifically, in a process of migrating hot data out from the low-speed memory to the high-speed memory, if it is detected that a data amount (e.g., 150 MB) of hot data having been migrated within a historical period (e.g., the recent 1 second) exceeds a corresponding upper limit threshold (e.g., 100 MB), then the above interval threshold will be reduced, for example, from 100 milliseconds to 90 milliseconds; or, if it is detected that a data amount (e.g., 80 MB) of hot data having been migrated in the historical period is less than a corresponding lower limit threshold (e.g., 90 MB), then the above interval threshold will be increased, for example, from 100 milliseconds to 105 milliseconds. In this way, by dynamically adjusting the interval threshold, the degradation of heterogeneous memory usage performance caused by untimely migration of hot and cold data may be avoided.

In this way, labelling of the above certain memory page in the low-speed memory may be achieved. According to an embodiment in another aspect, an associated memory page of this certain memory page may also be labelled. Specifically, this certain memory page corresponds to a certain operation object in the application layer, and in a case that this certain operation object has a preconfigured associated operation object, the same hotness label as the one this certain memory page has is added for a memory page corresponding to this associated operation object.

From the above, addition of hotness labels for memory pages in the low-speed memory may be achieved, which are thereby incorporated into the above access frequency information. Based on the above, step S230 may be executed, i.e., migrating hot data determined based on the hotness label in the above access frequency information from the low-speed memory to the high-speed memory.

In one embodiment, assuming that the above hotness label indicates whether data in a corresponding memory page is hot data, then data in a memory page in the low-speed memory with the above positive hotness label may be classified as hot data. Further, in one specific embodiment, in a case where a current remaining available space in the high-speed memory is taken into account, if a space occupied by memory pages with positive hotness labels is not greater than the current remaining available space, all of them will be used as hot data to be migrated; otherwise, part of memory pages occupying this current remaining available space will be selected from the memory pages with the positive hotness labels, and then data therein will be used as hot data to be migrated out.

In another embodiment, assuming that the above hotness label indicates a hotness level of a corresponding memory page, then a memory page in the low-speed memory with a hotness level greater than a preset level may be determined, and data therein may be used as the above hot data. Further, in one specific embodiment, in a case where a current remaining available space in the high-speed memory is taken into account, if a space occupied by memory pages with hotness labels is not greater than the current remaining available space, all of them will be used as hot data to be migrated; otherwise, corresponding memory pages may be sequentially classified as hot data based on the hotness levels in descending order until the space occupied by the hot data reaches the above current remaining available space.

From the above, hot data may be determined. Further, the hot data is migrated out from the low-speed memory to the high-speed memory. In one specific embodiment, assuming that the above hotness label indicates a hotness level, then hot data with a high hotness level may be migrated out preferentially. In another aspect, in one specific embodiment, during a hot data migration process, if it is detected that a data amount of hot data having been migrated in a historical period (e.g., the recent 5 seconds) exceeds a corresponding threshold (e.g., 1G), then a bandwidth currently occupied by the migration will be lowered, specifically, for example, being lowered by a predetermined percentage (e.g., being downregulated by 10%), or being lowered to a preset bandwidth value (e.g., 150 MB/s).

In this way, when CPU frequently accesses the low-speed memory, speed limiting may be used to avoid excessive hot data being migrated from the low-speed memory to the high-speed memory, thereby reducing overhead of CPU resource and bandwidth.

As for identification and migration-out of the above hot data, one typical example will be further introduced below. In response to a certain memory page in the low-speed memory having been accessed, a time interval between a time when it is migrated out from the high-speed memory to the low-speed memory and a current time may be determined. In a case where it is determined that this time interval is less than an interval threshold, this certain memory page will be used as hot data, or in other words, data in this certain memory page will be used as hot data and migrated to the high-speed memory. Further, in a case that an operation object corresponding to this certain memory page in the application layer has a preconfigured associated operation object, a memory page corresponding to this associated operation object will also be migrated out as hot data. In this way, extremely quick identification of hot data and premigration of associated data may be achieved, thereby effectively enhancing the read-write performance of the heterogeneous memory. In addition, it should be noted that the above migration method supports migration of unmapped pages, where the unmapped pages refer to memory pages that cannot be located through a mapping relationship between virtual addresses and physical addresses. Specifically, when CPU accesses an unmapped memory page through a system call, it may identify this as a remote access, thereby determining a time interval between a time when this memory page is migrated out from the high-speed memory to the low-speed memory and the current time, and then determining whether it belongs to hot data according to the time interval.

From the above, by employing the above data migration method, hot data in the low-speed memory may be determined based on the access frequency information and migrated to the high-speed memory, thereby achieving automatic identification and migration of the hot data in the low-speed memory.

It should be understood that after performing migration of hot and cold data by employing the data migration method disclosed in the embodiments of this specification, memory address remapping may be performed automatically, and the user is unaware of this. In addition, data stored in the above heterogeneous memory may comprise user data, such as user files, software program data downloaded by the user, or the like, and may further comprise a kernel object.

Figure 3:
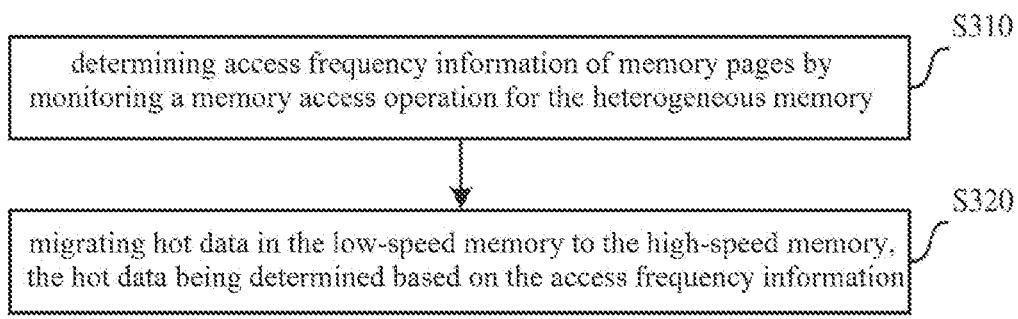
FIG. 3 illustrates a schematic flow chart of a data migration method based on a heterogeneous memory according to another embodiment.

According to another aspect, an embodiment of this specification further discloses another data migration method. FIG. 3 illustrates a schematic flow chart of a data migration method based on a heterogeneous memory according to another embodiment. As shown in FIG. 3, the method comprises the following steps: at step S310, determining access frequency information of memory pages by monitoring a memory access operation for the heterogeneous memory; and at step S320, migrating hot data in a low-speed memory to a high-speed memory, the hot data being determined based on the above access frequency information. It should be noted that as for description of step S310 and step S320, reference may be made to the relevant description in the foregoing embodiments, which will not be repeated here.

Figure 4:
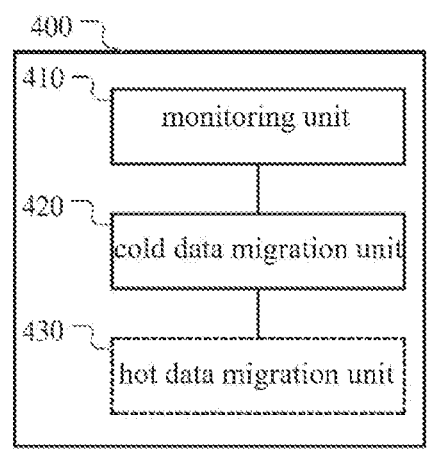
FIG. 4 illustrates a schematic structural diagram of a data migration apparatus based on a heterogeneous memory according to an embodiment.

Corresponding to the above data migration method, an embodiment of this specification further discloses a data migration apparatus. FIG. 4 illustrates a schematic structural diagram of a data migration apparatus based on a heterogeneous memory according to an embodiment, wherein the heterogeneous memory comprises a low-speed memory and a high-speed memory. As shown in FIG. 4, the apparatus 400 comprises the following constituent units:

a monitoring unit 410, configured to determine access frequency information of memory pages by monitoring a memory access operation for the heterogeneous memory; and a cold data migration unit 420, configured to migrate, under a first condition, cold data in the high-speed memory to the low-speed memory, the cold data being determined based on the access frequency information.

In one embodiment, the monitoring unit 410 is specifically configured to: periodically acquire, according to a predetermined time cycle, a recent access interval of each memory page in the high-speed memory, the recent access interval indicates a number of interval cycles between a last access operation time and a current time cycle; and determine, according to the recent access interval, a coldness label of each memory page, and incorporate the coldness label into the access frequency information.

In one specific embodiment, the coldness label indicates whether a corresponding memory page is a cold page; and the cold data migration unit 420 is specifically configured to: determine, in the high-speed memory, at least part of pages indicated as cold pages by the coldness labels, and migrate data in the at least part of pages as the cold data to the low-speed memory.

In another specific embodiment, the coldness label indicates a coldness level of a corresponding memory page; and the cold data migration unit 420 is specifically configured to sequentially, in descending order of the coldness levels, migrate cold data in corresponding memory pages to the low-speed memory.

In one embodiment, the first condition comprises one of the following: it has been detected that a current remaining available space of the high-speed memory is less than a preset first capacity; a memory request has been received, and a requested capacity by the memory request is greater than the current remaining availably space; a memory request has been received, and an expected remaining space after deducting the requested capacity by the memory request from the current remaining available space is less than a preset second capacity.

In one embodiment, the cold data migration unit 420 is specifically configured to: lower a bandwidth currently occupied by the migration if it is detected that a data amount of cold data having been migrated within a historical period exceeds a corresponding threshold during the process of migration. In another aspect, in one embodiment, the apparatus 400 further comprises: a hot data migration unit 430, configured to migrate hot data in the low-speed memory to the high-speed memory, the hot data being determined based on the access frequency information.

In one specific embodiment, the monitoring unit 410 is specifically configured to: monitor memory access paths for the heterogeneous memory to acquire hot path information; and add, according to the hot path information, a hotness label for a relevant memory page in the low-speed memory.

In one example, the hot path information comprises: information of a memory access path with an access frequency greater than a frequency threshold within a preset first time period; or information of a memory access path with an access history within a second time period from a current moment.

In another specific embodiment, the monitoring unit 410 is specifically configured to: in response to a certain memory page in the low-speed memory having been accessed, determine a time interval between a time when the certain memory page is migrated out from the high-speed memory to the low-speed memory and a current time; and add a hotness label for the certain memory page according to the time interval, and incorporate the hotness label into the access frequency information.

In one example, the certain memory page corresponds to a certain operation object in an application layer, the certain operation object having a preconfigured associated operation object; wherein the monitoring unit 410 is further configured to add the hotness label for a memory page corresponding to the associated operation object according to the time interval.

In another example, the hotness label indicates a hotness level of a corresponding memory page; and the hot data migration unit 430 is specifically configured to: sequentially, in descending order of the hotness levels, migrate hot data in corresponding memory pages to the high-speed memory.

In one specific embodiment, the hotness label indicates whether data in a corresponding memory page is hot data, and the hotness label is determined based on a comparison between the time interval and an interval threshold.

Further, in one example, the hot data migration unit 430 is specifically configured to: reduce the interval threshold if it is detected that a data amount of the hot data having been migrated within a historical period exceeds a corresponding upper limit threshold; or increase the interval threshold if it is detected that a data amount of the hot data having been migrated is less than a corresponding lower limit threshold.

In one specific embodiment, the hot data migration unit 430 is specifically configured to lower a bandwidth currently occupied by hot data migration if it is detected that a data amount of the hot data having been migrated within a historical period exceeds a corresponding threshold in a process of migrating the hot data.

Figure 5:
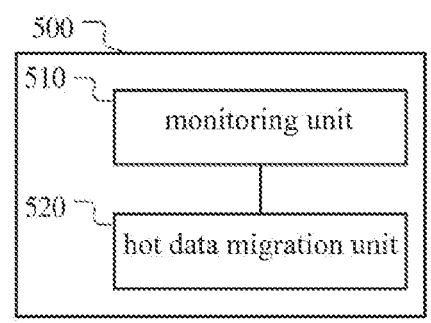
FIG. 5 illustrates a schematic structural diagram of a data migration apparatus based on a heterogeneous memory according to another embodiment.

FIG. 5 illustrates a schematic structural diagram of a data migration apparatus based on a heterogeneous memory according to another embodiment, wherein the heterogeneous memory comprises a low-speed memory and a high-speed memory. As shown in FIG. 5, the apparatus 500 comprises the following constituent units:

a monitoring unit 510, configured to determine access frequency information of memory pages by monitoring a memory access operation for the heterogeneous memory; a hot data migration unit 520, configured to migrate hot data in the low-speed memory to the high-speed memory, the hot data being determined based on the access frequency information.

In one embodiment, the monitoring unit 510 is specifically configured to: monitor memory access paths for the heterogeneous memory to acquire hot path information; and add, according to the hot path information, a hotness label for a relevant memory page in the low-speed memory.

In one specific embodiment, the hot path information comprises: information of a memory access path with an access frequency greater than a frequency threshold within a preset first time period; or information of a memory access path with an access history within a second time period from a current moment.

In another embodiment, the monitoring unit 510 is specifically configured to: in response to a certain memory page in the low-speed memory having been accessed, determine a time interval between a time when the certain memory page is migrated out from the high-speed memory to the low-speed memory and a current time; and add a hotness label for the certain memory page according to the time interval, and incorporate the hotness label into the access frequency information.

In one specific embodiment, the certain memory page corresponds to a certain operation object in an application layer, the certain operation object having a preconfigured associated operation object; wherein the monitoring unit 510 is further configured to add the hotness label for a memory page corresponding to the associated operation object according to the time interval.

In another specific embodiment, the hotness label indicates a hotness level of a corresponding memory page; and the hot data migration unit 520 is specifically configured to sequentially, in descending order of the hotness levels, migrate hot data in corresponding memory pages to the high-speed memory.

In one embodiment, the hotness label indicates whether data in a corresponding memory page is hot data, and the hotness label is determined based on a comparison between the time interval and an interval threshold.

Further, in one specific embodiment, the hot data migration unit 520 is specifically configured to: reduce the interval threshold if it is detected that a data amount of the hot data having been migrated within a historical period exceeds a corresponding upper limit threshold; or increase the interval threshold if it is detected that a data amount of the hot data having been migrated is less than a corresponding lower limit threshold.

In one embodiment, the hot data migration unit 520 is specifically configured to lower a bandwidth currently occupied by hot data migration if it is detected that a data amount of the hot data having been migrated within a historical period exceeds a corresponding threshold in a process of migrating the hot data.

According to an embodiment in another aspect, a computer-readable storage medium is further provided, in which a computer program is stored, and the computer program, when executed in a computer, causes the computer to execute the method described referring to FIG. 2 or FIG. 3.

According to an embodiment in still another aspect, a computing device is further provided, comprising a memory and a processor, executable codes being stored in the memory, and implementing, when executed by the processor, the method described referring to FIG. 2 or FIG. 3. Those skilled in the art should be aware that in one or more of the above examples, the functions described in the present invention may be implemented using hardware, software, firmware, or any combination thereof. When implemented using software, these functions may be stored in a computer-readable medium or transmitted as one or more instructions or codes in the computer-readable medium.

The specific implementations mentioned above provide a further detailed explanation of the purpose, technical solutions, and beneficial effects of the present invention. It should be understood that the above are merely specific implementations of the present invention and are not intended to limit the scope of protection of the present invention. Any modifications, equivalent replacements, improvements, or the like made on the basis of the technical solutions of the present invention should be included in the scope of protection of the present invention.

What is claimed is:

1. A data migration method based on a heterogeneous memory, the heterogeneous memory comprising a first memory area and a second memory area, wherein a read-write speed in the first memory area is higher than a read-write speed in the second memory area; and the method comprises:
    determining access frequency information of memory pages by monitoring a memory access operation for the heterogeneous memory;
    migrating, under a first condition, cold data in the first memory area to the second memory area, wherein the cold data is determined based on the access frequency information; and
    migrating hot data in the second memory area to the first memory area, wherein the hot data is determined based on the access frequency information;
    wherein the determining the access frequency information of the memory pages by monitoring the memory access operation for the heterogeneous memory comprises;
    monitoring memory access paths for the heterogeneous memory to acquire hot path information; and
    adding, according to the hot path information, a hotness label for a relevant memory page in the second memory area.

2. The method according to claim 1, wherein the determining the access frequency information of the memory pages by monitoring the memory access operation for the heterogeneous memory comprises:
    periodically acquiring, according to a predetermined time cycle, a recent access interval of each memory page in the first memory area, wherein the recent access interval indicates a number of interval cycles between a last access operation time and a current time cycle; and
    determining, according to the recent access interval, a coldness label of each memory page, and incorporating the coldness label of each memory page into the access frequency information.

3. The method according to claim 2, wherein the coldness label indicates whether a corresponding memory page is a cold page; and the migrating the cold data in the first memory area to the second memory area comprises:

determining, in the first memory area, at least part of pages that are indicated as the cold pages by the coldness labels, and migrating data in the at least part of pages as the cold data to the second memory area.

4. The method according to claim 2, wherein the coldness label indicates a coldness level of a corresponding memory page; and migrating the cold data in the first memory area to the second memory area comprises:

sequentially, in descending order of the coldness levels, migrating cold data in corresponding memory pages to the second memory area.

5. The method according to claim 1, wherein the first condition comprises one of following:

it has been determined that a current remaining available space of the first memory area is less than a preset first capacity;

a memory request has been received, and a requested capacity by the memory request is greater than the current remaining available space; or a memory request has been received, and an expected remaining space after deducting the requested capacity by the memory request from the current remaining available space is less than a preset second capacity.

6. The method according to claim 1, wherein the migrating, under the first condition, the cold data in the first memory area to the second memory area comprises:

migrating the cold data to the second memory area in a case where it is detected that a current remaining available space in the first memory area is less than a preset first capacity;

after migrating the cold data in the first memory area to the second memory area, the method further comprises:

receiving a memory request, and allocating a corresponding requested capacity in the first memory area, wherein the corresponding requested capacity is not greater than the preset first capacity.

7. The method according to claim 1, wherein the hot path information comprises:

information of a memory access path with an access frequency greater than a frequency threshold within a preset first time period; or information of a memory access path with an access history within a second time period from a current moment.

8. The method according to claim 1, wherein the hotness label indicates a hotness level of a corresponding memory page; and the migrating the hot data in the second memory area to the first memory area comprises:

sequentially, in descending order of the hotness levels, migrating hot data in corresponding memory pages to the first memory area.

9. A data migration method based on a heterogeneous memory, the heterogeneous memory comprising a first memory area and a second memory area, wherein a read-write speed in the first memory area is higher than a read-write speed in the second memory area; and the method comprises:

determining access frequency information of memory pages by monitoring a memory access operation for the heterogeneous memory;

migrating, under a first condition, cold data in the first memory area to the second memory area, wherein the cold data is determined based on the access frequency information; and migrating hot data in the second memory area to the first memory area, wherein the hot data is determined based on the access frequency information;

wherein the determining the access frequency information of the memory pages by monitoring the memory access operation for the heterogeneous memory comprises:

in response to a certain memory page in the second memory area having been accessed, determining a time interval between a time when the certain memory page is migrated out from the first memory area to the second memory area and a current time; and adding a hotness label for the certain memory page according to the time interval, and incorporating the hotness label into the access frequency information.

10. The method according to claim 9, wherein the certain memory page corresponds to a certain operation object in an application layer, and the certain operation object has a preconfigured associated operation object; wherein the determining the access frequency information of the memory pages comprises:

adding, according to the time interval, the hotness label for a memory page corresponding to the associated operation object.

11. The method according to claim 9, wherein the hotness label indicates whether data in a corresponding memory page is the hot data, and the hotness label is determined based on a comparison between the time interval and an interval threshold.

12. The method according to claim 11, wherein the migrating the hot data in the second memory area to the first memory area comprises:

reducing the interval threshold if it is detected that a data amount of the hot data having been migrated within a historical period exceeds a corresponding upper limit threshold; or increasing the interval threshold if it is detected that a data amount of the hot data having been migrated is less than a corresponding lower limit threshold.

13. The method according to claim 9, wherein the hotness label indicates a hotness level of a corresponding memory page; and the migrating the hot data in the second memory area to the first memory area comprises:

sequentially, in descending order of the hotness levels, migrating hot data in corresponding memory pages to the first memory area.

14. A computing device, comprising a memory and a processor, wherein executable codes are stored in the memory, and implement, when executed by the processor, operations of:

determining access frequency information of memory pages by monitoring a memory access operation for a heterogeneous memory;

migrating, under a first condition, cold data in a first memory area to a second memory area, wherein the cold data is determined based on the access frequency information; and migrating hot data in the second memory area to the first memory area, wherein the hot data is determined based on the access frequency information;

wherein the determining the access frequency information of the memory pages by monitoring the memory access operation for the heterogeneous memory comprises:

monitoring memory access paths for the heterogeneous memory to acquire hot path information; and adding, according to the hot path information, a hotness label for a relevant memory page in the second memory area.

\* \* \* \* \*